US012692881B2

(12) United States Patent
Ogawa et al.

(10) Patent No.: US 12,692,881 B2
(45) Date of Patent: Jul. 28, 2026

(54) PRESSURE APPLYING DEVICE

(71) Applicant: EAGLE INDUSTRY CO., LTD., Tokyo (JP)

(72) Inventors: Yoshihiro Ogawa, Tokyo (JP); Kuniaki Miyake, Tokyo (JP); Noriyuki Ogawa, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/874,903

(22) PCT Filed: Jun. 16, 2023

(86) PCT No.: PCT/JP2023/022371
§ 371 (c)(1),
(2) Date: Dec. 13, 2024

(87) PCT Pub. No.: WO2023/243703
PCT Pub. Date: Dec. 21, 2023

(65) Prior Publication Data

US 2025/0361887 A1 Nov. 27, 2025

(30) Foreign Application Priority Data

Jun. 17, 2022 (JP) ................................ 2022-098428
Oct. 13, 2022 (JP) ................................ 2022-164904

(51) Int. Cl.
*F15B 15/14* (2006.01)
*F15B 15/16* (2006.01)

(52) U.S. Cl.
CPC .............. *F15B 15/14* (2013.01); *F15B 15/16* (2013.01)

(58) Field of Classification Search
CPC ...... F15B 15/16; F15B 15/14; B22D 17/2069; B22D 17/32
See application file for complete search history.

(56) References Cited

U.S. PATENT DOCUMENTS 1,289,795 A * 12/1918 Johnson .................. B22C 15/10 91/401
2,786,409 A * 3/1957 Claire .................... A61C 13/18 249/154
4,531,451 A * 7/1985 Mouton .................. F15B 11/22 92/108
8,944,157 B2 * 2/2015 Mail ......................... B66F 3/26 166/383
11,131,192 B2 * 9/2021 Goldfarb .................. F01B 7/16

FOREIGN PATENT DOCUMENTS

JP 8226401 9/1996
JP 202120224 2/2021
WO WO2004113622 A 12/2004

* cited by examiner

*Primary Examiner* — Dustin T Nguyen
(74) *Attorney, Agent, or Firm* — HAYES SOLOWAY P.C.

(57) ABSTRACT

There is provided a pressure applying device capable of applying pressure to a working object with a substantially constant force through a compact structure. The pressure applying device includes a pressure accumulating portion; and a pressure transmitting body that transforms a pressure of the pressure accumulating portion to transmit the transformed pressure to a working object.

4 Claims, 9 Drawing Sheets

PRESSURE APPLYING DEVICE

TECHNICAL FIELD

The present invention relates to a pressure applying device, for example, a pressure applying device that applies pressure to a working object.

BACKGROUND ART

There is a cylinder device used as a pressure applying device that applies pressure to a working object using the pressure of a fluid, and a piston can apply pressure to the working object by receiving the pressure of the fluid and moving inside a cylinder.

For example, a pressure applying device of Patent Citation 1 includes a cylinder device, a pump, and an accumulator. When a pressurized fluid is supplied to the cylinder device from the pump or the accumulator, a piston moves relative to a cylinder inside the cylinder to apply pressure to a working object.

CITATION LIST

Patent Literature

Patent Citation 1: JP 2021-20224 A (Page 5, FIG. 1)

SUMMARY OF INVENTION

Technical Problem

However, in the pressure applying device of Patent Citation 1, in order to apply a substantially constant applied pressure to the working object, it is necessary to supply an appropriate fluid to the cylinder at any time using the pump and the accumulator, and the size of the pressure applying device is increased, which is a problem.

The present invention has been made in view of such problems, and an object of the present invention is to provide a pressure applying device capable of applying pressure to a working object with a substantially constant force through a compact structure.

Solution to Problem

In order to solve the foregoing problems, a pressure applying device according to the present invention includes a pressure accumulating portion; and a pressure transmitting body that transforms a pressure of the pressure accumulating portion to transmit the transformed pressure to a working object. According to the aforesaid feature of the present invention, since the pressure transmitting body transforms the pressure of the pressure accumulating portion to transmit the transformed pressure to the working object, a change in the pressure applied to the working object within the pressure transformation range of the pressure transmitting body can be reduced with a compact structure in which an accumulator, a pump, or the like is not used.

It may be preferable that gas is pressurized and accumulated in the pressure accumulating portion. According to this preferable configuration, the pressure applying device can be made lightweight.

It may be preferable that the pressure transmitting body is a piston including a small-diameter portion and a large-diameter portion, the small-diameter portion is inserted and disposed in a cylinder portion communicating with the pressure accumulating portion, and the large-diameter portion is disposed on a working object side. According to this preferable configuration, since the pressure of the pressure accumulating portion acting on the small-diameter portion is dispersed in the large-diameter portion and is transmitted to the working object, a change in the pressure applied to the working object within the stroke range of the piston can be reduced.

It may be preferable that a guide body guided by an outer peripheral surface of the cylinder portion is attached to the pressure transmitting body. According to this preferable configuration, since the pressure transmitting body is guided in a movement direction by the small-diameter portion inside the cylinder portion and the guide body outside the cylinder portion, the stroke of the pressure transmitting body is stabilized.

It may be preferable that the pressure accumulating portion is a cylinder-shaped gas chamber, and a diameter of the cylinder portion is smaller than a diameter of the gas chamber. According to this preferable configuration, since the cylinder portion has a smaller diameter than the gas chamber, a rapid decrease in the pressure of the pressure accumulating portion when the pressure transmitting body strokes toward the working object side can be suppressed.

It may be preferable that the large-diameter portion is disposed so as to come into direct contact with and separate from the working object.

According to the sixth aspect, since the large-diameter portion can directly apply pressure to the working object, namely, applies pressure to the working object without the intervention of other members, there is no risk of deformation or the like caused by the other members, and the amount of pressure applied to the working object is stabilized.

DESCRIPTION OF EMBODIMENTS

Figure 1:
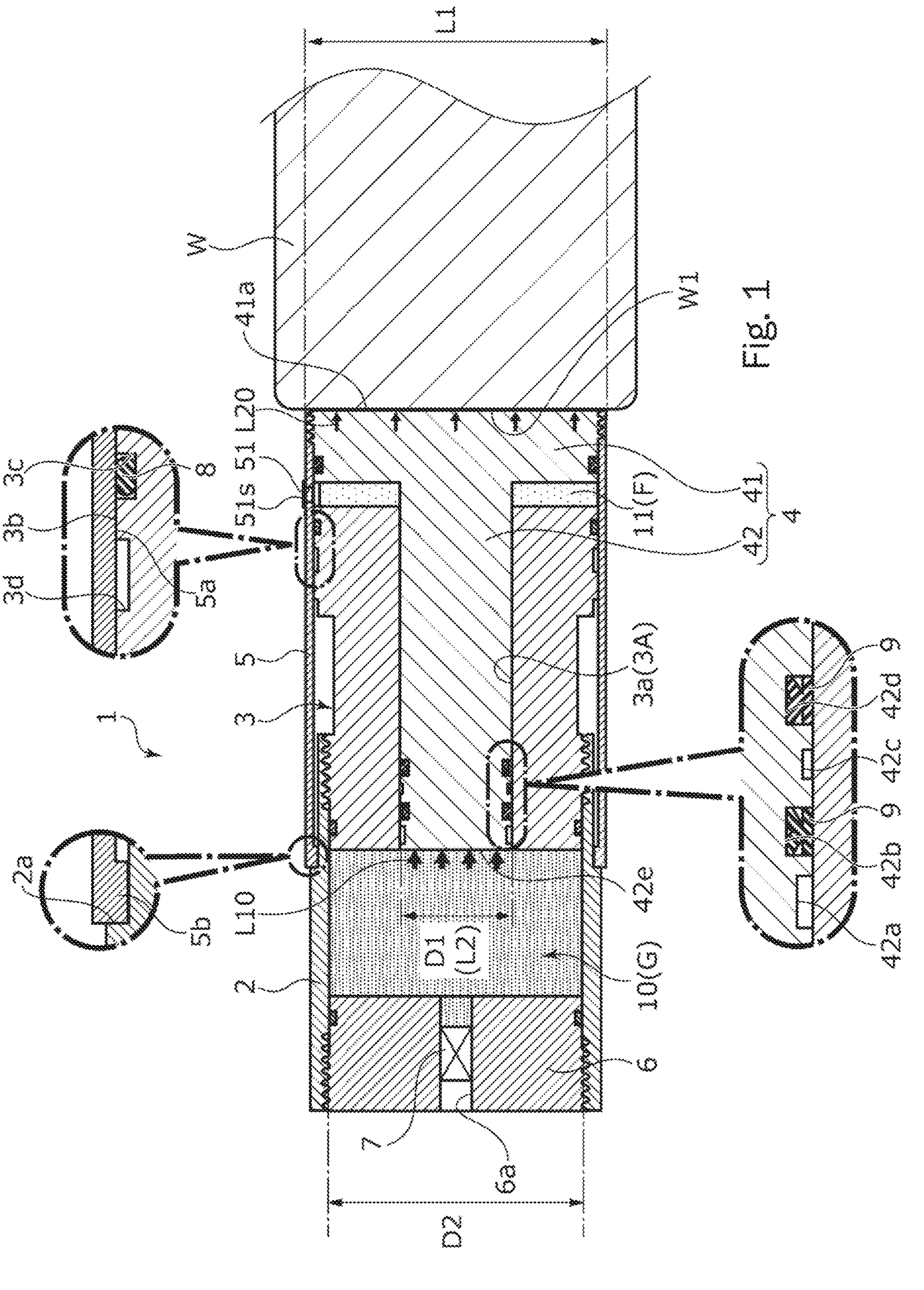
FIG. 1 is a longitudinal sectional view illustrating a contracted state of a pressure applying device according to a first embodiment of the present invention.

Modes for implementing a pressure applying device according to the present invention will be described below based on embodiments.

First Embodiment

A pressure applying device according to a first embodiment of the present invention will be described with reference to FIGS. 1 and 2. Hereinafter, the description will be made based on the assumption that the left side of the drawing sheet of FIG. 1 is a left side of the pressure applying device and the right side of the drawing sheet of FIG. 1 is a right side of the pressure applying device.

As illustrated in FIG. 1, a pressure applying device 1 applies pressure to a working object W using the pressure of a fluid. The description will be made based on the assumption that the working object W of the present embodiment is disposed on the right side of the pressure applying device 1 and the position of a pressure applied surface W1 changes in an axial direction, namely, a left-right direction of the drawing sheet of FIG. 1 depending on the state of use.

The pressure applying device 1 mainly includes a casing 2, a connecting body 3 as a cylinder portion, a piston 4 as a pressure transmitting body, and a tubular body 5 as a guide body.

The casing 2 has a tubular shape. A right end portion of an outer peripheral surface of the casing 2 has a smaller diameter than a left end portion. Namely, a step portion 2*a* serving as a movement restricting portion is formed in an annular shape on the outer peripheral surface of the casing 2.

In addition, a lid member 6 is connected to an inner peripheral surface of the left end portion of the casing 2 in a sealed manner by screwing. A through-hole 6*a* is formed at a central portion of the lid member 6. A plug 7 is attached to the through-hole 6*a*. Incidentally, the casing 2 and the lid member 6 may be integrally formed from the same member.

The connecting body 3 has a stepped tubular shape having a through-hole 3A. A left end portion of the connecting body 3 is screwed and connected to an inner peripheral surface of the right end portion of the casing 2 in a sealed manner. Incidentally, in the present embodiment, a mode in which the casing 2 and the connecting body 3 are separate bodies has been provided as an example; however, the casing 2 and the connecting body 3 may be integrally formed from the same member.

Annular recessed portions 3*c* and 3*d* recessed in a radially inward direction are provided spaced apart from each other in the axial direction on an outer peripheral surface 3*b* of a flange of a right end portion of the connecting body 3, the flange extending in a radially outward direction. A seal ring 8 is fitted and disposed in the annular recessed portion 3*c* on the right side. The annular recessed portion 3*d* on the left side is shallower than the annular recessed portion 3*c*, and the seal ring 8 is not fitted into the annular recessed portion 3*d*.

An O-ring has been described as an example of the seal ring 8; however, the seal ring 8 may be of any type such as an X-ring and a lip seal. In addition, the annular recessed portion 3*d* has an oil reservoir function, and allows smooth sliding. Incidentally, the annular recessed portion 3*d* may be provided at any axial position on the outer peripheral surface 3*b* of the flange as long as the annular recessed portion 3*d* can enhance slidability.

The piston 4 includes a large-diameter portion 41 and a small-diameter portion 42. The large-diameter portion 41 has a disk shape. The small-diameter portion 42 has a columnar shape, and extends from a central portion of the large-diameter portion 41 toward the left side.

A diameter L1 of the large-diameter portion 41 is larger than a diameter L2 of the small-diameter portion 42, and in the present embodiment, is a dimension of approximately three times the diameter L2. Incidentally, the diameter L1 of the large-diameter portion 41 may be larger than the diameter L2 of the small-diameter portion 42, and preferably, the diameter L1 of the large-diameter portion 41 may be a dimension of approximately 2 to 5 times the diameter L2 of the small-diameter portion 42.

The large-diameter portion 41 has a flat end surface 41*a* on the right side. The end surface 41*a* is disposed to be able to come into direct contact with and separate from the working object W. Specifically, the end surface 41*a* comes into surface contact with the pressure applied surface W1 of the working object W. Incidentally, the end surface 41*a* may be stuck to the pressure applied surface W1 of the working object W, and move integrally with the working object W.

The small-diameter portion 42 is inserted and disposed in the through-hole 3A of the connecting body 3 to be slidable on an inner peripheral surface 3*a* of the connecting body 3. Four annular recessed portions 42*a* to 42*d* recessed in the radially inward direction are provided spaced apart from each other in the axial direction on the left side of an outer peripheral surface of the small-diameter portion 42.

The leftmost annular recessed portion 42*a* and the third annular recessed portion 42*c* from the left side are formed to be shallower than the second annular recessed portion 42*b* from the left side and the rightmost annular recessed portion 42*d*. In addition, a seal ring 9 is fitted and disposed in each of the annular recessed portion 42*b* and the annular recessed portion 42*d*. Incidentally, the seal rings 9 are not fitted into the annular recessed portions 42*a* and 42*c*.

An X-ring has been described as an example of the seal ring 9; however, the seal ring 9 may be of any type such as an O-ring and a lip seal. Further, since a plurality of the seal rings 9, specifically, two seal rings 9 are disposed in the axial direction, there is almost no oil leakage to a pressure accumulating portion 10, and the piston 4 is less likely to tilt during movement.

In addition, the annular recessed portions 42*a* and 42*c* have a gas reservoir function and an oil reservoir function, and can prevent gas leakage and allow smooth sliding.

The seal rings 9 are slidable in the axial direction with respect to the inner peripheral surface 3*a* of the connecting body 3, and restrict movement of the fluid in the axial direction.

By inserting the small-diameter portion 42 into the through-hole 3A of the connecting body 3, the pressure accumulating portion 10 is formed on the left side of the pressure applying device 1. Specifically, the pressure accumulating portion 10 is a space surrounded by the casing 2, the connecting body 3, the piston 4, and the lid member 6. The volume of the pressure accumulating portion 10 changes as the piston 4 moves as will be described later (refer to FIG. 2).

High-pressure gas G from the outside through a gas introduction port (not illustrated) of the plug 7 is sealed in the pressure accumulating portion 10. In other words, the pressure accumulating portion 10 is a cylinder-shaped gas chamber.

A diameter D1 of the through-hole 3A of the connecting body 3 is smaller than a diameter D2 of the pressure accumulating portion 10, and in the present embodiment, is a dimension of approximately ⅓ times the diameter D2 (D1<D2). Incidentally, the diameter D1 of the through-hole 3A may be smaller than the diameter D2 of the pressure accumulating portion 10, and preferably, the diameter D1 of the through-hole 3A is a dimension of approximately ½ to ⅕ times the diameter D2 of the pressure accumulating portion 10.

A right end portion of the tubular body 5 is screwed and connected to an outer peripheral surface of the large-diameter portion 41 in a sealed manner, and the tubular body 5 is integrated with the piston 4. A right end surface of the tubular body 5 is disposed to be substantially flush with the end surface 41*a* on the right side of the large-diameter portion 41 or on the left side with respect to the end surface 41*a*. According to this configuration, the tubular body 5 does not hinder surface contact between the end surface 41*a* of the large-diameter portion 41 and the pressure applied surface W1 of the working object W.

An inner peripheral surface 5*a* of the tubular body 5 is slidable in the axial direction with respect to the outer peripheral surface 3*b* of the right end portion of the connecting body 3. The seal ring 8 restricts movement of the fluid in the axial direction between the inner peripheral surface 5*a* of the tubular body 5 and the outer peripheral surface 3*b* of the connecting body 3.

A space portion 11 is formed on the right side of the pressure applying device 1 by the connecting body 3, the large-diameter portion 41 and the small-diameter portion 42 of the piston 4, and the tubular body 5. Oil F as a lubricating fluid is held in the space portion 11. The volume of the space portion 11 changes as the piston 4 moves as will be described later (refer to FIG. 2).

A breathing hole 51 is formed at an upper right portion of the tubular body 5. Namely, the space portion 11 communicates with the external atmospheric space through the breathing hole 51.

In addition, an end portion 5*b* on the left side of the tubular body 5 projects toward a radially inner side. As will be described later, when the piston 4 and the tubular body 5 have moved to a leftmost position, in other words, when the tubular body 5 is inserted the furthest into the connecting body 3, the end portion 5*b* comes into contact with the step portion 2*a* of the casing 2.

Next, the contracted state and the extended state of the pressure applying device 1 will be described using FIGS. 1 and 2. Incidentally, the casing 2 is fixed to a fixed body (not illustrated), and is immovable at least in the axial direction, namely, the left-right direction.

As illustrated in FIG. 1, in a state where the working object W is disposed at the leftmost position, the pressure applying device 1 is in the contracted state where the piston 4 and the tubular body 5 have moved to the leftmost position. When the pressure applying device 1 is in the contracted state, the end portion 5*b* on the left side of the tubular body 5 comes into contact with the step portion 2*a* of the casing 2, and the movement of the piston 4 and the tubular body 5 toward the left side is restricted.

When the pressure applying device 1 is in the contracted state, the volume of the pressure accumulating portion 10 is at its smallest within the stroke range of the piston 4, and the gas G is in the most compressed state. The movement of the gas G toward the space portion 11 on the right side is restricted by the seal rings 9 and 9. In addition, the annular recessed portions 42*a* and 42*c* function as gas reservoirs, so that the leakage of the gas G can be suppressed.

The pressure of the gas G in the pressure accumulating portion 10 acts on a left surface 42*e* of the small-diameter portion 42 (refer to arrow L10). The pressure of the gas G acting on the left surface 42*e* of the small-diameter portion 42 is transmitted to the working object W as stress dispersed in the large-diameter portion 41 (refer to arrow L20).

In addition, when the pressure applying device 1 is in the contracted state, the breathing hole 51 of the tubular body 5 is disposed on the right side with respect to the connecting body 3. Namely, the breathing hole 51 is not closed.

Further, a water-repellent ventilation sheet 51*s* is installed to close the breathing hole 51, and allows gas to flow while preventing water from entering the space portion 11 from the outside.

In addition, the liquid level of the oil F is located in the vicinity of a bottom of the breathing hole 51. Accordingly, the oil F is supplied to a gap between the outer peripheral surface of the small-diameter portion 42 of the piston 4 and the inner peripheral surface 3*a* of the connecting body 3, and the oil F does not leak from the breathing hole 51 to the atmospheric space.

Figure 2:
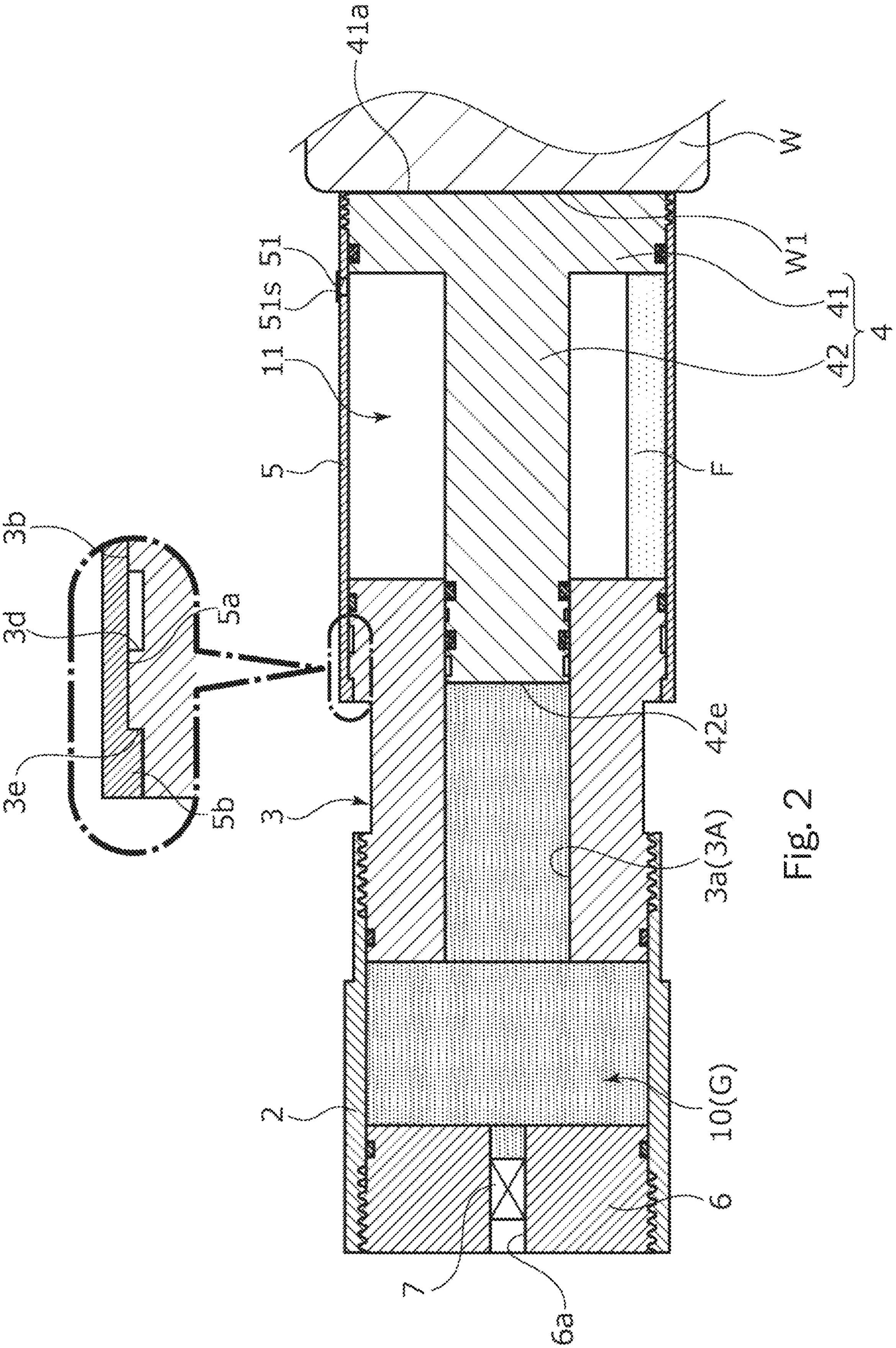
FIG. 2 is a longitudinal sectional view illustrating an extended state of the pressure applying device in the first embodiment.

As illustrated in FIG. 2, in a state where the pressure applied surface W1 of the working object W is disposed at a rightmost position, the pressure applying device 1 is in the extended state where the piston 4 and the tubular body 5 have moved to the rightmost position. When the pressure applying device 1 is in the extended state, the end portion 5*b* on the left side of the tubular body 5 comes into contact with a step portion 3*e* of the connecting body 3, and the movement of the piston 4 and the tubular body 5 toward the right side is restricted.

When the pressure applying device 1 is in the extended state, the volume of the pressure accumulating portion 10 is at its largest within the stroke range of the piston 4, and the pressure of the gas G has decreased.

In addition, when the pressure applying device 1 is in the extended state, the breathing hole 51 moves in a direction separated from the connecting body 3, namely, toward the right side compared to when the pressure applying device 1 is in the contracted state, so that the breathing hole 51 is not closed. In addition, the liquid level of the oil F is located below the through-hole 3A of the connecting body 3.

A description will be given of when the piston 4 moves toward the right side from the contracted state of the pressure applying device 1 in FIG. 1 to the extended state of the pressure applying device 1 in FIG. 2. Since the diameter D1 of the through-hole 3A of the connecting body 3 is smaller than the diameter D2 of the pressure accumulating portion 10, and the pressure of the gas G acting on the left surface 42*e* of the small-diameter portion 42 is dispersed as small stress in the large-diameter portion 41 and is transmitted to the working object W, the pressure of the gas G is prevented from decreasing rapidly as the piston 4 moves toward the right side.

In other words, since the pressure of the gas G decreases gently as the piston 4 moves toward the right side, a change in the pressure applied to the working object W within the stroke range of the piston 4 can be reduced. Therefore, pressure can be applied to the working object W with a substantially constant force within the stroke range of the piston 4 without supplying the fluid from the outside using an accumulator, a pump, or the like, so that the pressure applying device 1 can be compactly configured. Namely, since the diameter D1 is smaller than the diameter D2, and the pressure of the small-diameter portion 42 does not change rapidly and is maintained at a high pressure within the stroke range of the piston 4, namely, is a high pressure, the required volume of the pressure accumulating portion 10 may be smaller than when the gas G is at a low pressure (the same pressure as in the space portion 11 or the like).

In addition, the stroke of the piston 4 becomes smooth due to the oil F supplied to the gap between the outer peripheral surface of the small-diameter portion 42 of the piston 4 and the inner peripheral surface 3*a* of the connecting body 3. Incidentally, some of the oil F remaining in the gap between the outer peripheral surface of the small-diameter portion 42 and the inner peripheral surface 3*a* of the connecting body 3 flows into the annular recessed portions 42*a* and 42*c*, and contributes to lubricity of the stroke of the piston 4.

In addition, the oil F in the space portion 11 enters a gap between the outer peripheral surface 3*b* of the connecting body 3 and the inner peripheral surface 5*a* of the tubular body 5 when the tubular body 5 moves toward the left side as will be described later, and the movement of the tubular body 5 becomes smooth due to the oil F remaining in the gap.

In addition, since the piston 4 is guided in a movement direction by the small-diameter portion 42 inside the connecting body 3 and the tubular body 5 outside the connecting body 3, the stroke of the piston 4 is stabilized. According to this configuration, in a state where the end surface 41*a* of the large-diameter portion 41 is in surface contact with the pressure applied surface W1 of the working object W, pressure can be applied to the working object W straight toward the right side by the piston 4, so that a load can be prevented from being applied to the working object W.

In addition, when the piston 4 moves toward the left side from the extended state of the pressure applying device 1 in FIG. 2 toward the contracted state of the pressure applying device 1 in FIG. 1, as the piston 4 moves toward the left side, the pressure of the gas G increases depending on the diameter of the small-diameter portion 42.

In other words, since the pressure of the gas G is slightly increased depending on the diameter of the small-diameter portion 42 as the piston 4 moves toward the left side, but the pressure of the gas does not change rapidly and is a high pressure, the stroke amount of the piston 4 can be secured without discharging the gas G to the outside.

In addition, the stroke of the piston 4 can be smoothly performed due to the oil F remaining in the gap between the outer peripheral surface of the small-diameter portion 42 and the inner peripheral surface 3*a* of the connecting body 3.

In addition, when the volume of the space portion 11 decreases gradually and the liquid level of the oil F reaches the through-hole 3A of the connecting body 3, the oil F is supplied to the gap between the outer peripheral surface of the small-diameter portion 42 of the piston 4 and the inner peripheral surface 3*a* of the connecting body 3.

In addition, the oil F in the space portion 11 enters the gap between the outer peripheral surface 3*b* of the connecting body 3 and the inner peripheral surface 5*a* of the tubular body 5, and the movement of the tubular body 5 also becomes smooth. Some of the oil F remaining in the gap between the outer peripheral surface 3*b* of the connecting body 3 and the inner peripheral surface 5*a* of the tubular body 5 flows into the annular recessed portion 3*d*, and contributes to the lubricity of the stroke of the tubular body 5.

In addition, since the breathing hole 51 is not closed throughout the entire stroke of the piston 4, the pressure in the space portion 11 can be prevented from increasing, and the stroke of the piston 4 can be stably performed.

As described above, since the piston 4 transforms the pressure of the pressure accumulating portion 10 to transmit the transformed pressure to the working object W, a change in the pressure applied to the working object W within the pressure transformation range of the piston 4 can be reduced with a compact structure in which an accumulator, a pump, or the like is not used.

Specifically, the piston 4 includes the large-diameter portion 41 and the small-diameter portion 42, the small-diameter portion 42 is inserted and disposed in the through-hole 3A of the connecting body 3, and the large-diameter portion 41 is disposed on a working object W side. According to this configuration, since the pressure of the pressure accumulating portion 10 acting on the small-diameter portion 42 is dispersed in the large-diameter portion 41 and is transmitted to the working object W, a change in the pressure applied to the working object W within the stroke range of the piston 4 can be reduced.

In addition, the gas G is pressurized and accumulated in the pressure accumulating portion 10. According to this configuration, since the gas G that is gas is sealed in the pressure accumulating portion 10, the pressure applying device 1 can be made lightweight.

In addition, since the piston 4 is guided in the movement direction by the small-diameter portion 42 inside the connecting body 3 and the tubular body 5 outside the connecting body 3, the stroke of the piston 4 is stabilized.

In addition, since the diameter D1 of the through-hole 3A of the connecting body 3 is smaller than the diameter D2 of the pressure accumulating portion 10, the pressure of the gas G can be prevented from decreasing rapidly as the piston 4 moves toward the right side.

In addition, the large-diameter portion 41 is disposed to be able to come into direct contact with and separate from the working object W. According to this configuration, since the large-diameter portion 41 can directly apply pressure to the working object W, the amount of pressure applied to the working object W is stabilized.

In addition, since the tubular body 5 is attached to the large-diameter portion 41, and extends parallel to the small-diameter portion 42 toward the left side, the pressure applying device 1 is short in total length and is compact.

Second Embodiment

A pressure applying device according to a second embodiment of the present invention will be described with reference to FIGS. 3 and 4. Incidentally, the description of configurations that are the same as and overlap with the configurations of the first embodiment will be omitted.

Figure 3:
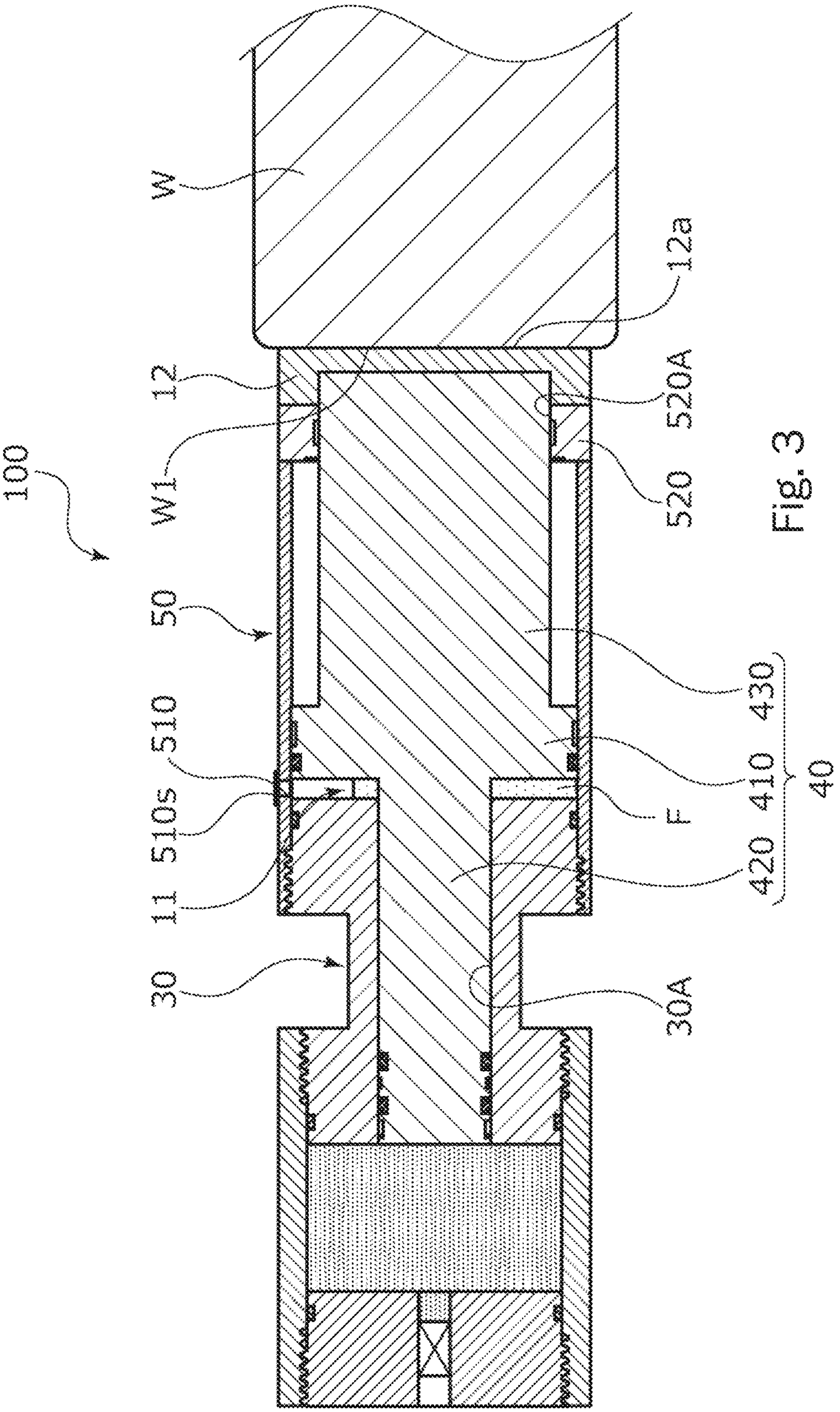
FIG. 3 is a longitudinal sectional view illustrating a contracted state of a pressure applying device according to a second embodiment of the present invention.

As illustrated in FIG. 3, in a pressure applying device 100 of the second embodiment, a left end portion of a tubular body 50 is connected to a right end portion of a connecting body 30 in a sealed manner by screwing. Incidentally, the connecting body 30 and the tubular body 50 may be integrally formed from the same member.

A breathing hole 510 of the tubular body 50 is provided at an upper left portion of the tubular body 50, and is closed by a water-repellent ventilation sheet 510*s*. In addition, a lid body 520 having an annular shape is attached to a right end portion of the tubular body 50.

A piston 40 includes a large-diameter portion 410, a small-diameter portion 420, and a medium-diameter portion 430. The medium-diameter portion 430 has a columnar shape, and extends from a central portion of the large-diameter portion 410 toward the right side. The medium-diameter portion 430 has a smaller diameter than the large-diameter portion 410, and has a larger diameter than the small-diameter portion 420.

The medium-diameter portion 430 is inserted into a through-hole 520A of the lid body 520. A right end portion of the medium-diameter portion 430 is disposed at a right position with respect to the lid body 520, and a locking member 12 having a U shape in a cross-sectional view and serving as a movement restricting portion is fitted and fixed to the right end portion.

A flat right surface 12*a* of the locking member 12 is in surface contact with the pressure applied surface W1 of the working object W.

When the pressure applying device 100 is in a contracted state illustrated in FIG. 3, the locking member 12 comes into contact with the lid body 520, and the movement of the piston 40 toward the left side is restricted.

In addition, the breathing hole 510 of the tubular body 50 is disposed on the left side with respect to the large-diameter portion 410 of the piston 40.

In addition, since the liquid level of the oil F is located above a through-hole 30A of the connecting body 30, the oil F can be supplied to a gap between the small-diameter portion 420 and the connecting body 30.

Figure 4:
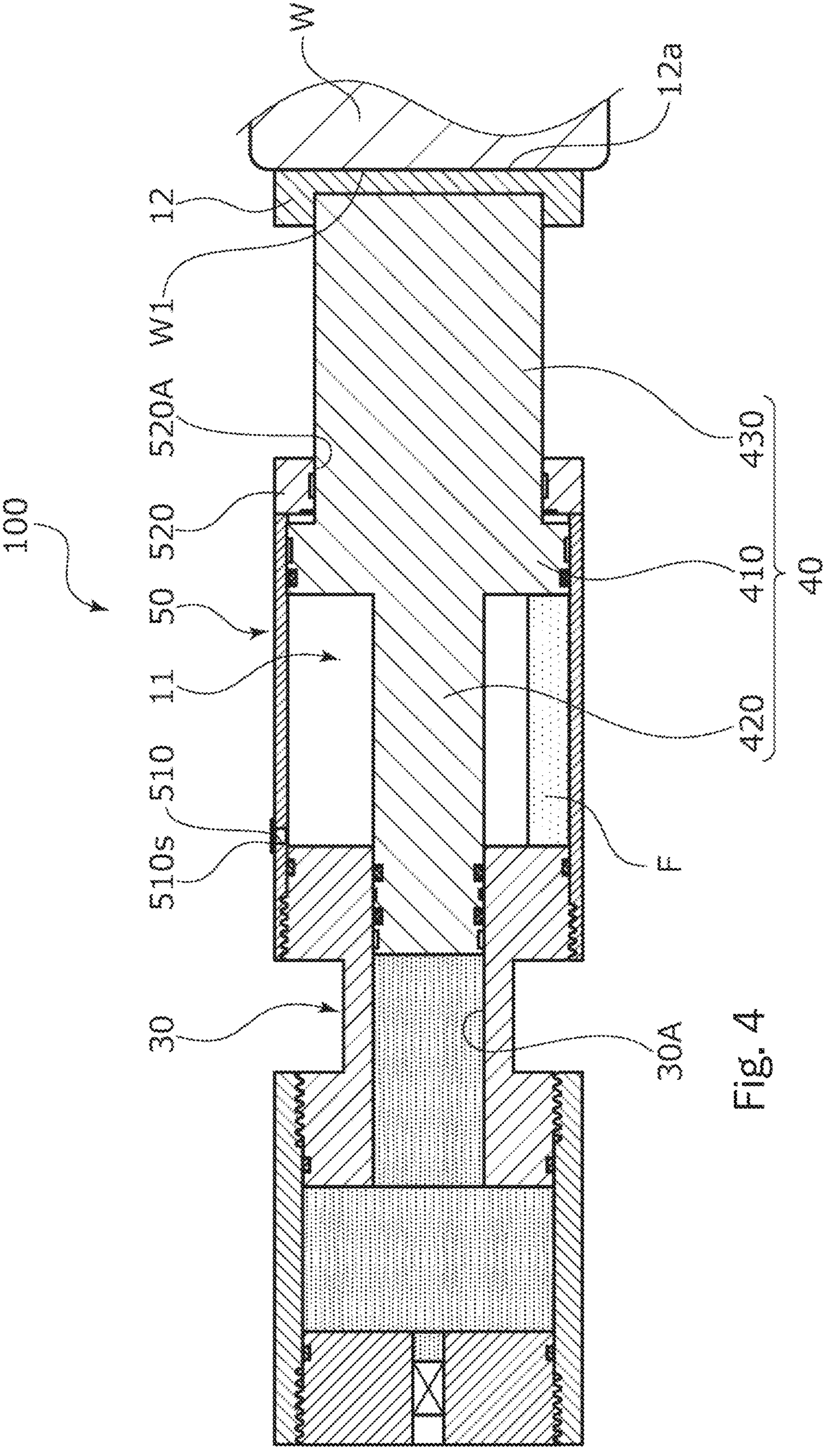
FIG. 4 is a longitudinal sectional view illustrating an extended state of the pressure applying device in the second embodiment.

When the pressure applying device 100 is in an extended state illustrated in FIG. 4, the piston 40 moves toward the right side compared to when the pressure applying device 100 is in the contracted state, so that the breathing hole 510 is not closed by the large-diameter portion 410 of the piston 40.

Namely, since the breathing hole 510 is not closed throughout the entire stroke of the piston 40, the pressure in a space portion 110 can be prevented from increasing due to the stroke of the piston 40.

In addition, when the piston 40 moves leftward and rightward, the oil F enters a gap between an inner peripheral surface of the tubular body 50 and an outer peripheral surface of the large-diameter portion 410, so that the stroke of the piston 40 can be smoothly performed.

Third Embodiment

Next, a pressure applying device according to a third embodiment of the present invention will be described with reference to FIG. 5. Incidentally, the description of configurations that are the same as and overlap with the configurations of the first embodiment will be omitted.

Figure 5:
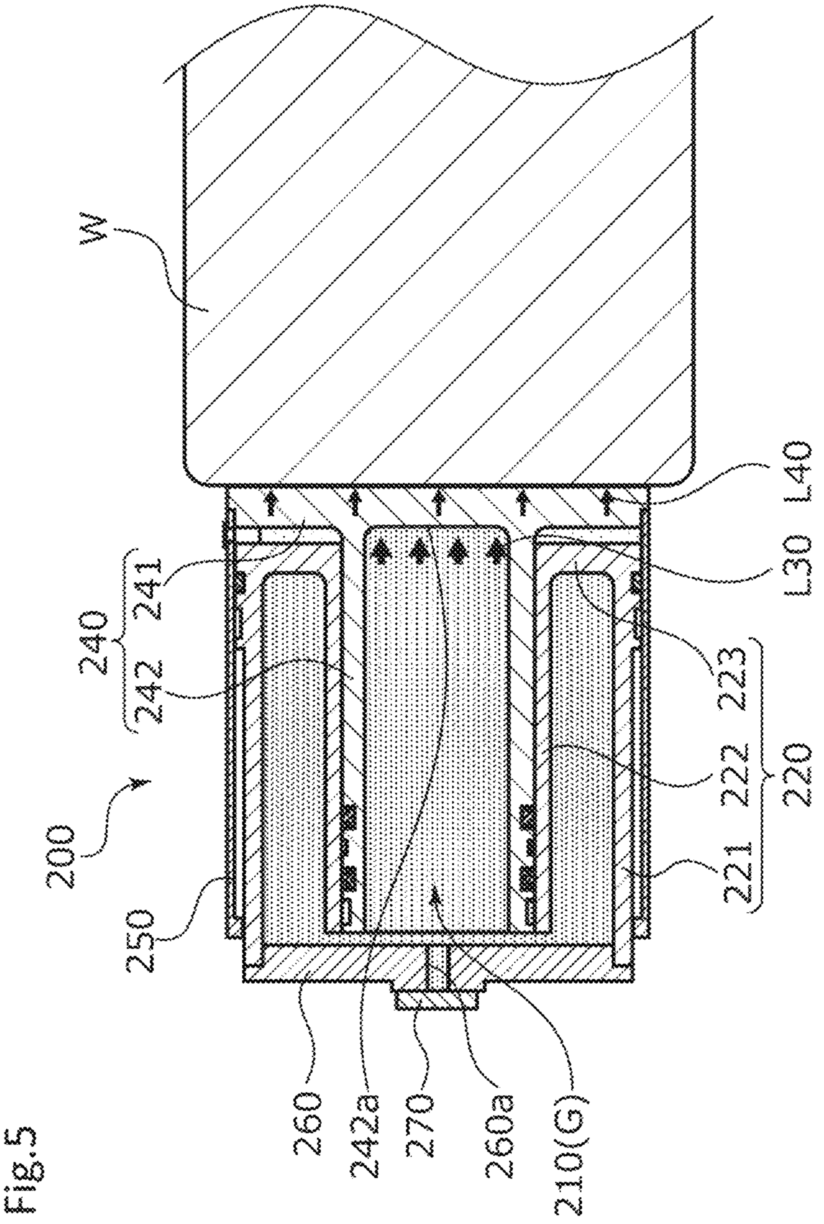
FIG. 5 is a longitudinal sectional view illustrating a contracted state of a pressure applying device according to a third embodiment of the present invention.

As illustrated in FIG. 5, a pressure applying device 200 of the third embodiment mainly includes a casing 220 as a cylinder portion, a piston 240 as a pressure transmitting body, a tubular body 250 as a guide body, and a lid member 260.

The casing 220 includes a radially outer side tubular portion 221, a radially inner side tubular portion 222, and a bottom portion 223.

The radially outer side tubular portion 221 has a larger diameter than the radially inner side tubular portion 222, and is disposed spaced apart from the radially inner side tubular portion 222 toward a radially outer side.

The radially inner side tubular portion 222 is concentric with the radially outer side tubular portion 221 when viewed in the axial direction. The radially inner side tubular portion 222 is shorter in the axial direction than the radially outer side tubular portion 221.

The bottom portion 223 couples a right end of the radially outer side tubular portion 221 and a right end of the radially inner side tubular portion 222. The bottom portion 223 extends in a radial direction orthogonally to a central axis of the radially outer side tubular portion 221 and the radially inner side tubular portion 222.

A left end portion of the casing 220 is open to the left side. A space between the radially outer side tubular portion 221 and the radially inner side tubular portion 222 at a right end portion of the casing 220 is closed by the bottom portion 223. A radially inner side of the radially inner side tubular portion 222 of the casing 220 is a through-space.

The lid member 260 is connected to a left end portion of the radially outer side tubular portion 221 in a sealed manner. A plug 270 is attached to a through-hole 260*a* of the lid member 260.

As described above, the radially inner side tubular portion 222 is shorter in the axial direction than the radially outer side tubular portion 221, and in a state where the lid member 260 is connected to the radially outer side tubular portion 221, a left end portion of the radially inner side tubular portion 222 is disposed spaced apart from the lid member 260 toward the right side.

The piston 240 includes a large-diameter portion 241 and a small-diameter portion 242. The small-diameter portion 242 has a tubular shape, and a right end portion of the small-diameter portion 242 is closed by the large-diameter portion 241.

A space between the radially outer side tubular portion 221 and the radially inner side tubular portion 222 of the casing 220, a space between the radially inner side tubular portion 222 and the lid member 260, and an internal space of the small-diameter portion 242 of the piston 240 form one communicating space, and serves as a pressure accumulating portion 210 in which the high-pressure gas G is sealed.

The pressure of the gas G in the pressure accumulating portion 210 acts on a bottom surface 242*a* of the small-diameter portion 242 (refer to arrow L30). The pressure of the gas G acting on the bottom surface 242*a* of the small-diameter portion 242 is transmitted to the working object W as stress dispersed in the large-diameter portion 241 (refer to arrow L40).

Accordingly, the pressure of the gas G in the pressure accumulating portion 210 does not change rapidly as the piston 240 moves in the axial direction, so that a change in the pressure applied to the working object W within the stroke range of the piston 240 can be reduced. Therefore, pressure can be applied to the working object W with a substantially constant force within the stroke range of the piston 240 without supplying the fluid from the outside using an accumulator, a pump, or the like, so that the pressure applying device 200 can be compactly configured.

In addition, since the internal space of the small-diameter portion 242 of the piston 240 can be used as the pressure accumulating portion 210, the pressure applying device 200 can be compactly configured.

In addition, since the space between the radially outer side tubular portion 221 and the radially inner side tubular portion 222 of the casing 220 is disposed on the radially outer side with respect to the internal space of the small-diameter portion 242 of the piston 240, and both the spaces can be overlapped in the radial direction, the pressure applying device 200 can be made compact in the axial direction.

Fourth Embodiment

Next, a pressure applying device according to a fourth embodiment of the present invention will be described with reference to FIG. 6. Incidentally, the description of configurations that are the same as and overlap with the configurations of the third embodiment will be omitted.

Figure 6:
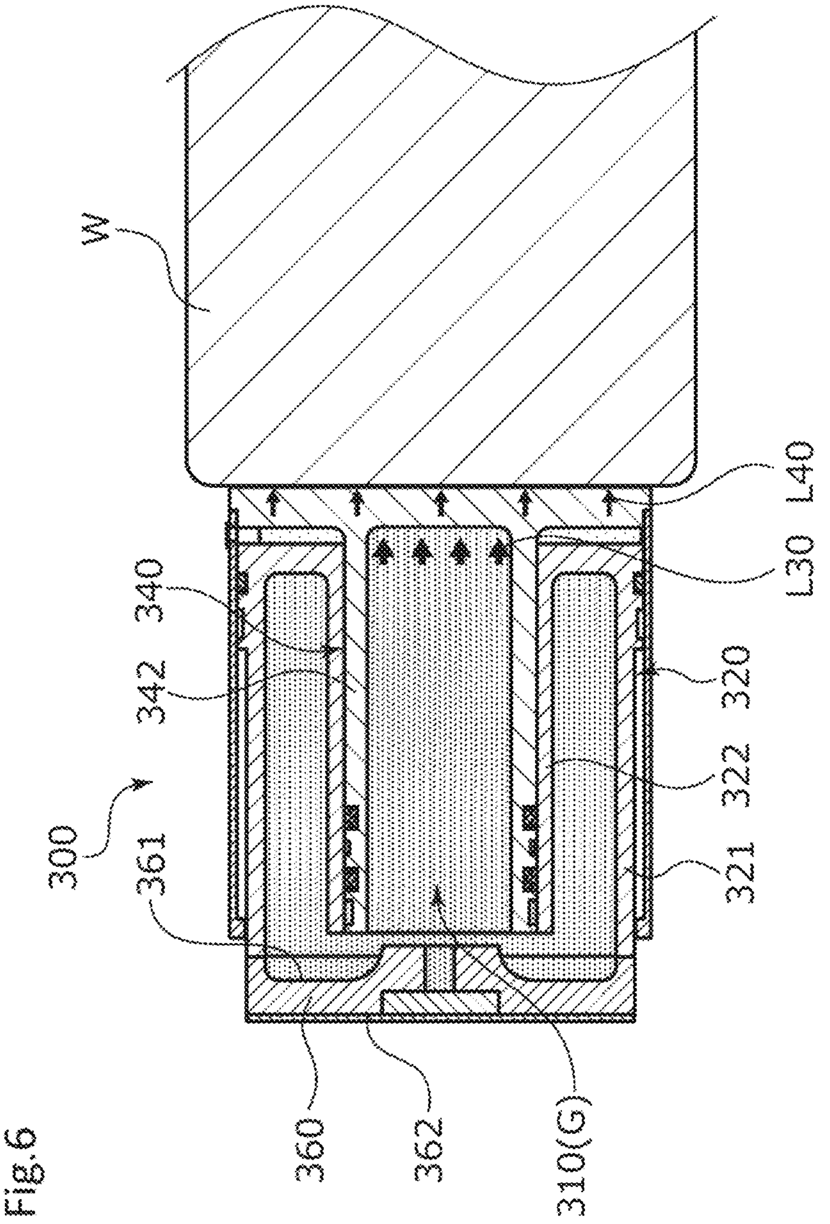
FIG. 6 is a longitudinal sectional view illustrating a contracted state of a pressure applying device according to a fourth embodiment of the present invention.

As illustrated in FIG. 6, in a pressure applying device 300 of the fourth embodiment, an annular recessed portion 361 is provided in a lid member 360. The annular recessed portion 361 expands a space between a radially outer side tubular portion 321 and a radially inner side tubular portion 322 of a casing 320 toward the left side. In addition, a radially inner portion of the annular recessed portion 361 is disposed on the radially inner side with respect to an inner peripheral surface of a small-diameter portion 342 of a piston 340. Further, a cover 362 that covers an end surface of the lid member 360 is provided on the left side of the lid member 360.

In such a manner, since a pressure accumulating portion 310 can be expanded by the annular recessed portion 361 provided in the lid member 360, the axial dimensions of the casing 320 and the piston 340 can be made compact.

In addition, since the radially inner portion of the annular recessed portion 361 is disposed on the radially inner side with respect to the inner peripheral surface of the small-diameter portion 342 of the piston 340, the movement of the gas G between the annular recessed portion 361 and an internal space of the small-diameter portion 342 becomes smooth.

Fifth Embodiment

A pressure applying device according to a fifth embodiment of the present invention will be described with reference to FIGS. 7 and 8. Incidentally, the descriptions of configurations that are the same as and overlap with the configurations of the fourth embodiment will be omitted. In addition, in FIG. 8, the illustration of the through-hole 260*a* and the plug 270 is omitted.

Figure 7:
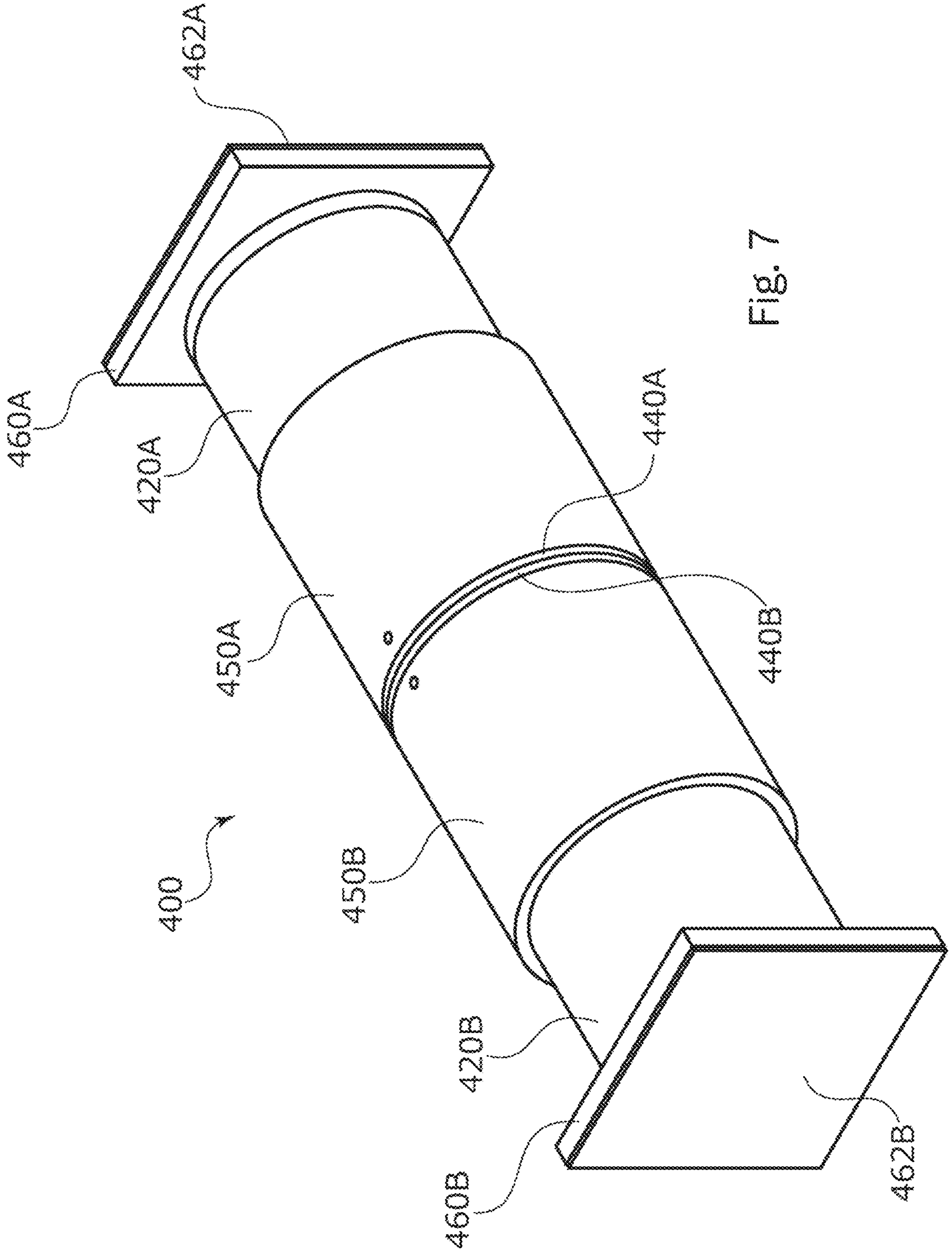
FIG. 7 is a perspective view illustrating an extended state of a pressure applying device according to a fifth embodiment of the present invention.
Figure 8:
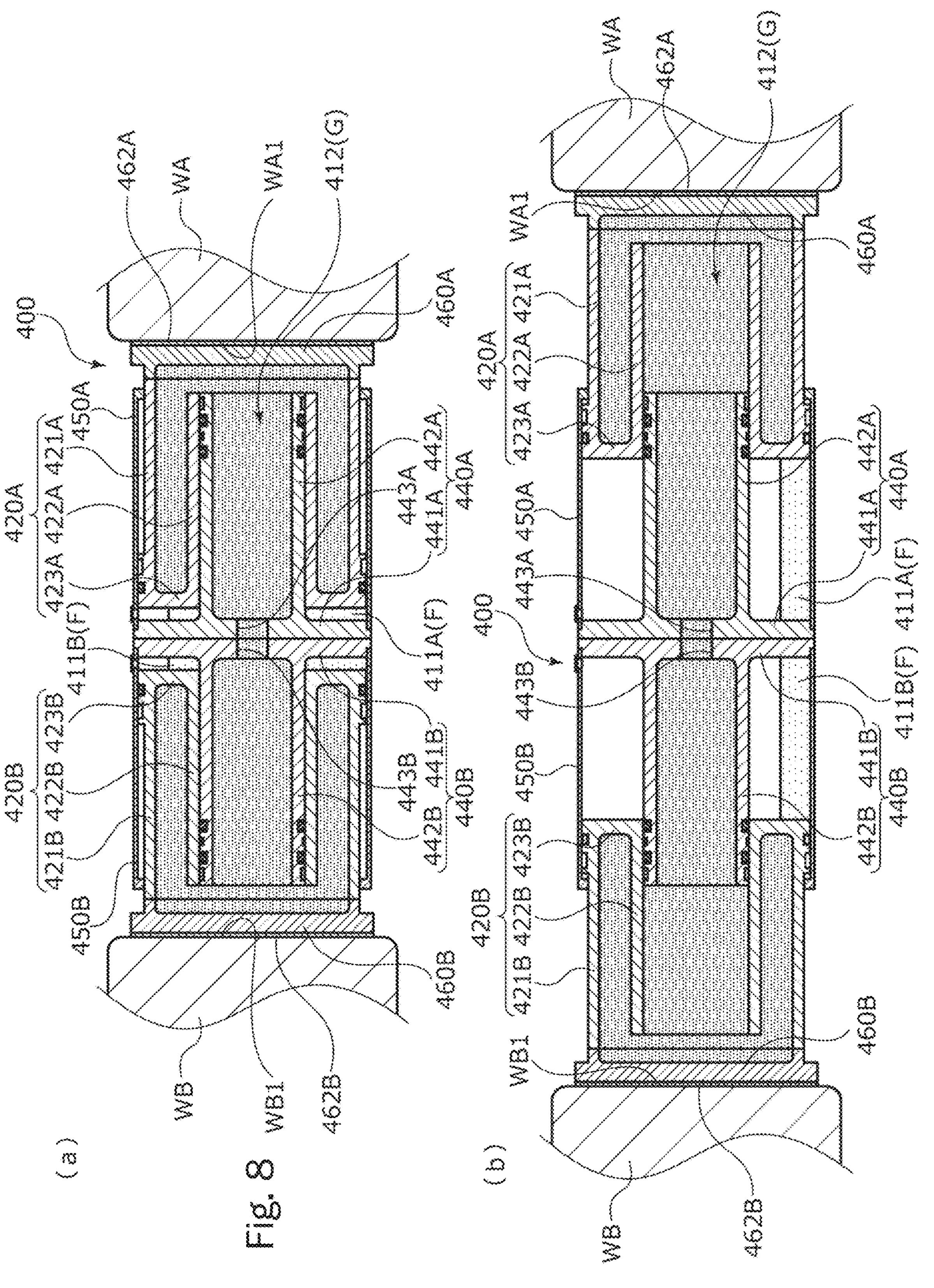
FIG. 8A is a longitudinal sectional view illustrating a contracted state of the pressure applying device in the fifth embodiment.
FIG. 8B is a longitudinal sectional view illustrating the extended state of the pressure applying device in the fifth embodiment.

As illustrated in FIG. 7 and FIGS. 8A and 8B, a pressure applying device 400 of the fifth embodiment mainly includes a pair of casings 420A and 420B as cylinder portions, a pair of pistons 440A and 440B, a pair of tubular bodies 450A and 450B as guide bodies, and a pair of lid members 460A and 460B as pressure transmitting bodies.

The casing 420A has substantially the same shape as the casing 320 of the fourth embodiment, and includes a radially outer side tubular portion 421A, a radially inner side tubular portion 422A, and a bottom portion 423A. Similarly, the casing 420B includes a radially outer side tubular portion 421B, a radially inner side tubular portion 422B, and a bottom portion 423B.

The piston 440A has substantially the same shape as the piston 340 of the fourth embodiment, and includes a large-diameter portion 441A and a small-diameter portion 442A. Similarly, the piston 440B includes a large-diameter portion 441B and a small-diameter portion 442B.

The large-diameter portions 441A and 441B are provided with through-holes 443A and 443B penetrating therethrough in the axial direction.

A left end portion of the tubular body 450A is fixed to an outer peripheral surface of the large-diameter portion 441A of the piston 440A. A right end portion of the tubular body 450B is fixed to an outer peripheral surface of the large-diameter portion 441B of the piston 440B.

The lid member 460A is connected to an opening-side end portion (namely, a right end portion) of the radially outer side tubular portion 421A of the casing 420A in a sealed manner, and a cover 462A is provided on an end portion (namely, a right end portion) on the working object WA side of the lid member 460A. The lid member 460B is connected to an opening-side end portion (namely, a left end portion) of the radially outer side tubular portion 421B of the casing 420B in a sealed manner, and a cover 462B is provided on an end portion (namely, a left end portion) on the working object WB of the lid member 460B.

The casings 420A and 420B, the pistons 440A and 440B, the tubular bodies 450A and 450B, the lid members 460A and 460B, and the covers 462A and 462B are unitized. Specifically, facing surfaces of the large-diameter portions 441A and 441B of the pistons 440A and 440B are connected to each other. The through-holes 443A and 443B of the large-diameter portions 441A and 441B communicate with each other. Incidentally, it is preferable that an annular gasket is disposed around the through-holes 443A and 443B to reliably prevent leakage of the high-pressure gas G.

Internal spaces of the casings 420A and 420B closed by the lid members 460A and 460B and internal spaces of the pistons 440A and 440B serve as a pressure accumulating portion 412 in which the high-pressure gas G is sealed.

The oil F as a lubricating fluid is held in a space portion 411A outside the casing 420A and the piston 440A, which is closed by the tubular body 450A. The oil F as a lubricating fluid is held in a space portion 411B outside the casing 420B and the piston 440B, which is closed by the tubular body 450B.

Working objects WA and WB are disposed on the right and left of the pressure applying device 400. The lid member 460A is fixedly connected to the working object WA via the cover 462A, and the lid member 460B is fixedly connected to the working object WB via the cover 462B. Incidentally, in the fifth embodiment, the casings 420A and 420B or the tubular bodies 450A and 450B are not fixed to a fixed body, and are freely movable.

FIG. 8A illustrates a contracted state of the pressure applying device 400, and FIG. 8B illustrates an extended state of the pressure applying device 400. In such a manner, pressure can be applied to the working objects WA and WB within an axially long range.

In addition, as described above, since the casings 420A and 420B or the tubular bodies 450A and 450B are not fixed to the fixed body, when the pressure applying device 400 is in a state other than the contracted state and the extended state, the casings 420A and 420B and the pistons 440A and 440B move according to the positions of pressure applied surfaces WA1 and WB1 of the working objects WA and WB.

For example, when the pressure applied surface WA1 of the working object WA has moved from the contracted state of the pressure applying device 400, the casing 420A, the pistons 440A and 440B, and the tubular bodies 450A and 450B move.

In such a manner, since the pistons 440A and 440B and the tubular bodies 450A and 450B are movable, it is possible to cope with when the axial positions of the working objects WA and WB change.

In addition, since communication between internal spaces of the right and left casings 420A and 420B and between internal spaces of the right and left pistons 440A and 440B is allowed, and the pressure accumulating portion 412 of the fifth embodiment has a larger volume than the pressure accumulating portion 210 of the third embodiment, the fluctuation of pressure in the pressure accumulating portion 412 due to extension and contraction of the pressure applying device 400 can be suppressed, and pressure can be applied to the working objects WA and WB with high accuracy.

Incidentally, by closing the through-holes 443A and 443B with plugs, communication between the internal spaces of the casings 420A and 420B and between the internal spaces of the right and left pistons 440A and 440B may not be allowed.

Incidentally, in the fifth embodiment, a mode in which one pressure applying device 400 applies pressure to two working objects WA and WB has been provided as an example; however, the present invention is not limited thereto, and a plurality of pressure applying devices may apply pressure to one working object.

Sixth Embodiment

Next, a pressure applying device according to a sixth embodiment of the present invention will be described with reference to FIG. 9. Incidentally, the descriptions of configurations that are the same as and overlap with the configurations of the fifth embodiment will be omitted.

Figure 9:
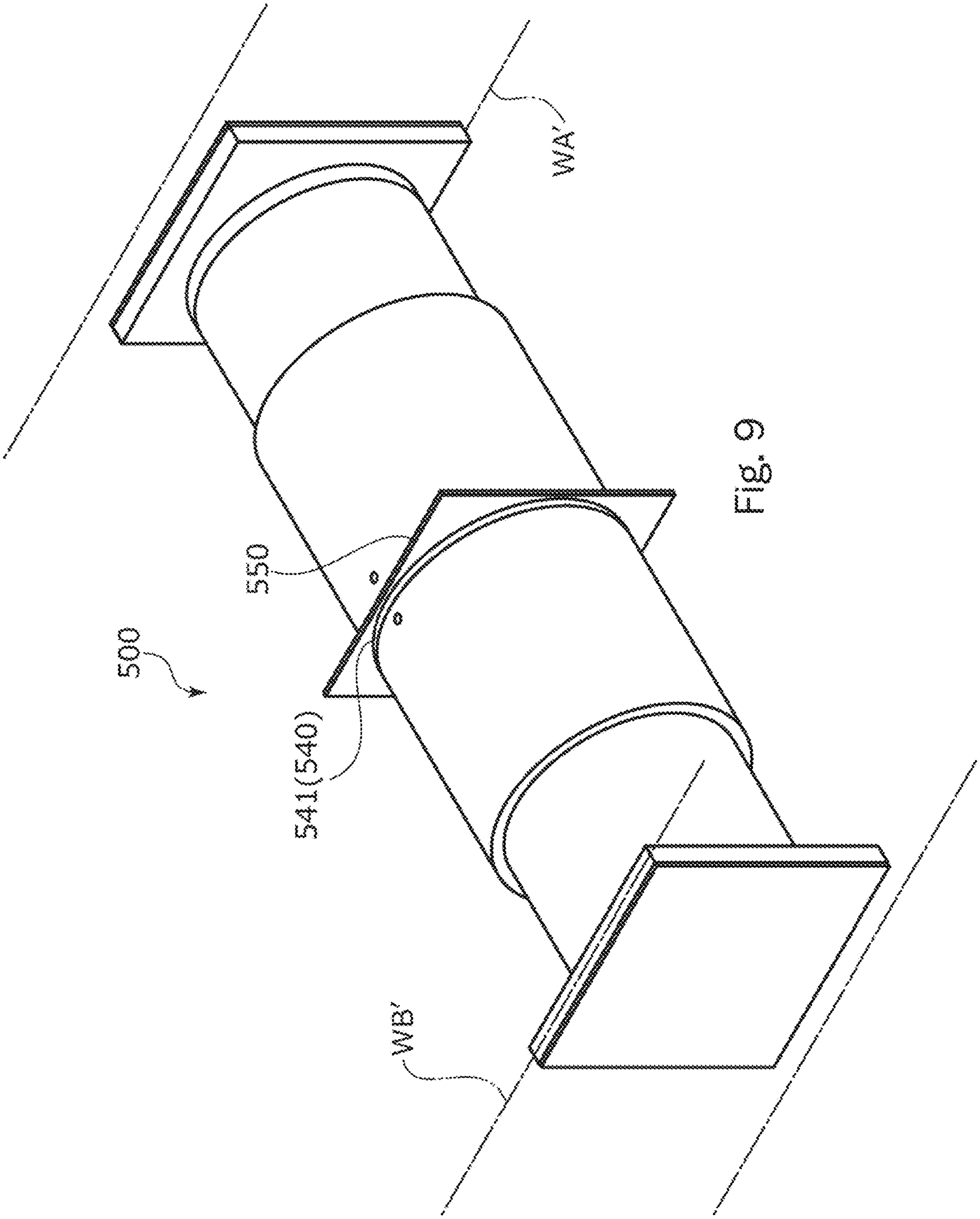
FIG. 9 is a perspective view illustrating an extended state of a pressure applying device according to a sixth embodiment of the present invention.

As illustrated in FIG. 9, a pressure applying device 500 of the sixth embodiment includes a fixing plate 550 fixed to outer peripheral surfaces (only one side is illustrated) of large-diameter portions 541 of a pair of pistons 540, and projecting toward the radially outer side.

The fixing plate 550 is fixed to a fixed body. According to this configuration, even when the extension and contraction widths of working objects WA' and WB' are different, the pistons 540 do not move in the axial direction, so that pressure can be stably applied to the working objects WA' and WB'.

The embodiments of the present invention have been described above with reference to the drawings; however, the specific configurations are not limited to the embodiments, and changes or additions that are made without departing from the scope of the present invention are included in the present invention.

For example, in the first to sixth embodiments, a mode in which the pressure transmitting body is a piston has been provided as an example; however, the pressure transmitting body may transform the pressure of the pressure accumulating portion to transmit the transformed pressure to the working object, for example, may receive the pressure of the pressure accumulating portion, and transform the pressure by deforming itself, to transmit the transformed pressure to the working object.

In addition, in the first to sixth embodiments, a mode in which the gas is pressurized and accumulated in the pressure accumulating portion has been provided as an example; however, a liquid such as oil or a mixture of a liquid and a gas may be sealed in the pressure accumulating portion.

In addition, in the first to sixth embodiments, a mode in which the stroke of the piston is guided by the tubular body and the outer peripheral surface of the cylinder portion has been provided as an example; however, the present invention is not limited thereto, and the guide body can be freely changed. For example, the stroke of the piston may be guided by providing a guide hole in the cylinder portion, providing a guide pin in the piston, and sliding the guide hole and the guide pin in a stroke direction.

In addition, there is no need to necessarily provide the tubular body, and the guide may include only the cylinder portion and the small-diameter portion.

In addition, in the first embodiment and the third to sixth embodiments, the large-diameter portion of the piston is in direct contact with the working object; however, a separate member may be interposed between the large-diameter portion of the piston and the working object.

In addition, in the first and second embodiments, a mode in which the breathing holes 51 and 510 are provided in the tubular bodies 5 and 50, respectively, has been provided as an example; however, the breathing holes 51 and 510 may not be provided, and in addition to a change in the pressure of the pressure accumulating portion 10, a change in the pressure of the space portion 11 may also be used.

In addition, in the first and second embodiments, a mode in which the annular recessed portion 3*d* and the annular recessed portions 42*a* and 42*c* are fluid reservoir spaces has been provided as an example; however, a component having a bearing function, a component that enhances lubricity, and a component that suppresses eccentricity may be inserted into the spaces.

In addition, in the first and second embodiments, a mode in which the small-diameter portions 42 and 420 of the pistons 4 and 40 are solid has been provided as an example; however, recessed portions recessed from left ends toward the right side may be formed in the small-diameter portions 42 and 420, and in this case, large volumes of the pressure accumulating portions can be secured.

REFERENCE SIGNS LIST

1 Pressure applying device
2*a* Step portion (movement restricting portion)
3 Connecting body (cylinder portion)
4 Piston (pressure transmitting body)
5 Tubular body (guide body)
10 Pressure accumulating portion
11 Space portion
12 Locking member (movement restricting portion)
30 Connecting body (cylinder portion)
40 Piston (pressure transmitting body)
41 Large-diameter portion
42 Small-diameter portion
50 Tubular body (guide body)
51 Breathing hole
100 Pressure applying device
110 Space portion
410 Large-diameter portion
420 Small-diameter portion
430 Medium-diameter portion
510 Breathing hole
F Oil
G Gas
W Working object

The invention claimed is:

1. A pressure applying device, comprising:

a pressure accumulating portion which is a fluid chamber in which fluid is pressurized and accumulated;

a pressure transmitting body that transforms a pressure of the pressure accumulating portion to transmit the transformed pressure to a working object; and a case having at least part of the pressure accumulating portion housed therein, wherein the pressure transmitting body is a piston provided with a cylinder portion having a first end which is opened, the case has an outer diameter side cylinder portion, an inner diameter side cylinder portion disposed inside the outer diameter side cylinder portion, a bottom portion configured to connect a first end of the outer diameter side cylinder portion and a first end of the inner diameter side cylinder portion, and a lid portion configured to close a second end of the outer diameter side cylinder portion, the piston is disposed inside the case such that at least part of an outer peripheral surface of the piston is slidable on an inner periphery surface of the inner diameter side cylinder portion, and a space between the outer diameter side cylinder portion and the inner diameter side cylinder portion of the case and a space inside the cylinder portion of the piston form one space which forms the fluid chamber as the pressure accumulating portion, the pressure applying device further comprises a guide body having a first end portion and a second end portion, the first end portion of the guide body is configured to slide on an outer peripheral surface of the outer diameter side cylinder portion of the case, and the second end portion of the guide body is fixed to the piston.

2. The pressure applying device according to claim 1, wherein the piston is further provided with a lid portion which closes a second end of the cylinder portion of the piston and which is configured to come into contact with and separate from the working object.

3. The pressure applying device according to claim 1, wherein the fluid is a gas.

4. A pressure applying device, comprising:

a pressure accumulating portion which is a fluid chamber in which fluid is pressurized and accumulated;

a case as a cylinder;

a piston at least part of which is housed in the case;

a lid member fixed to the case as a pressure transmitting body that transforms a pressure of the pressure accumulating portion to transmit the transformed pressure to a working object; and a guide body formed in a cylindrical shape and configured to guide the case in an axial direction, wherein the case has an outer diameter side cylinder portion and an inner diameter side cylinder portion disposed inside the outer diameter side cylinder portion, an outer peripheral surface of the outer diameter side cylinder portion is configured to slide with an inner peripheral surface of the guide body, a first axial end of the outer diameter side cylinder portion is hermetically closed by the lid member in hermetical state, the piston includes a large-diameter portion fixed to an axial end portion of the guide and a small-diameter portion configured to slide with an inner peripheral surface of the inner diameter side cylinder portion, and a space between the outer diameter side cylinder portion and the inner diameter side cylinder portion forms the fluid chamber as the pressure accumulating portion.

* * * * *